(12) United States Patent
Ferlitsch et al.

(10) Patent No.: US 8,373,875 B2
(45) Date of Patent: Feb. 12, 2013

(54) ADAPTIVE UNIVERSAL SYMBOL DRIVER INTERFACE

(75) Inventors: Andrew Rodney Ferlitsch, Tigard, OR (US); Ron Neil Patton, Lake Oswego, OR (US); Scott Craig Koss, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2851 days.

(21) Appl. No.: 10/870,817

(22) Filed: Jun. 17, 2004

(65) Prior Publication Data

US 2005/0283735 A1  Dec. 22, 2005

(51) Int. Cl.
*G06F 3/12* (2006.01)
*G06F 3/00* (2006.01)
*G06F 17/00* (2006.01)
*G06F 3/041* (2006.01)

(52) U.S. Cl. ...... 358/1.15; 358/1.13; 715/856; 715/273; 715/700; 345/173

(58) Field of Classification Search .................. 358/1.13, 358/1.14, 1.15, 1.18, 296, 401, 451, 500, 358/1.19; 709/206, 226; 715/500.1, 763, 715/856, 273; 399/81; 707/10
See application file for complete search history.

(56) References Cited

U.S. PATENT DOCUMENTS

| | | | | |
|---|---|---|---|---|
| 5,113,251 A * | 5/1992 | Ichiyanagi et al. | ........... | 358/500 |
| 5,436,730 A * | 7/1995 | Hube | ........................ | 358/401 |
| 5,481,353 A * | 1/1996 | Hicks et al. | .................. | 358/451 |
| 5,699,494 A * | 12/1997 | Colbert et al. | ............... | 358/1.15 |
| 5,727,135 A * | 3/1998 | Webb et al. | .................. | 358/1.14 |
| 5,875,035 A * | 2/1999 | Motosugi et al. | ............. | 358/296 |
| 6,100,812 A | 8/2000 | Tanaka et al. | | |
| 6,151,131 A * | 11/2000 | Pepin et al. | .................. | 358/1.13 |
| 6,362,841 B1 | 3/2002 | Nykanen | | |
| 6,462,756 B1 * | 10/2002 | Hansen et al. | ............... | 358/1.15 |
| 6,745,229 B1 * | 6/2004 | Gobin et al. | .................. | 709/206 |
| 6,795,663 B2 * | 9/2004 | Kato | ............................... | 399/81 |
| 7,027,172 B1 * | 4/2006 | Parulski et al. | ............. | 358/1.15 |
| 7,085,763 B2 * | 8/2006 | Ochiai et al. | .......................... | 1/1 |
| 7,177,045 B2 * | 2/2007 | Goel et al. | .................. | 358/1.18 |
| 7,266,768 B2 * | 9/2007 | Ferlitsch et al. | ............. | 715/273 |
| 7,268,907 B2 * | 9/2007 | Sato | ............................. | 358/1.15 |
| 7,296,238 B1 * | 11/2007 | Zurawski | ...................... | 715/763 |

(Continued)

FOREIGN PATENT DOCUMENTS

| | | |
|---|---|---|
| CA | 2246008 | 9/1999 |
| EP | 0812091 | 12/1997 |

(Continued)

*Primary Examiner* — Akwasi M Sarpong
(74) *Attorney, Agent, or Firm* — Law Office of Gerald Maliszewski; Gerald Maliszewski

(57) ABSTRACT

A system and method are provided for processing an imaging job using adaptive universal symbols. The method comprises: establishing a user interface (UI) representing imaging job options with adaptive universal symbols at a job source, which can be an imaging driver or a direct submit application; accepting adaptive universal symbol selections from the UI; sending an imaging job to an imaging device, in an imaging device-specific format, along with the adaptive universal symbol selections; and, at the imaging device, processing the imaging job in response to the selected adaptive universal symbols. With respect to print, copy, or fax jobs for example, the adaptive universal symbols may represent options such as staple, cut, fold, hole-punch, trim, N-up, duplex, paper size, input tray, output bin, copies, collation, margin, sheet/page orientation, or front/back covers.

30 Claims, 12 Drawing Sheets

U.S. PATENT DOCUMENTS

| | | | |
|---|---|---|---|
| 2002/0131065 A1 | 9/2002 | Sweetland et al. | 358/1.13 |
| 2003/0020956 A1* | 1/2003 | Goel et al. | 358/1.18 |
| 2003/0086119 A1 | 5/2003 | Nagasaka | 358/1.15 |
| 2003/0158909 A1* | 8/2003 | Simpson et al. | 345/733 |
| 2003/0161003 A1* | 8/2003 | Herbert | 358/1.18 |
| 2004/0052543 A1 | 3/2004 | Kato | |
| 2004/0205481 A1* | 10/2004 | Zuniga et al. | 715/500.1 |
| 2004/0246511 A1* | 12/2004 | Wong et al. | 358/1.13 |
| 2005/0062991 A1* | 3/2005 | Fujishige et al. | 358/1.9 |
| 2005/0114796 A1* | 5/2005 | Bast | 715/856 |

FOREIGN PATENT DOCUMENTS

| | | |
|---|---|---|
| EP | 0939531 | 9/1999 |
| EP | 1160657 | 12/2001 |
| JP | 09-326799 | 12/1997 |
| JP | 11-312064 | 11/1999 |
| JP | 11-327742 | 11/1999 |
| JP | 2000-174949 | 6/2000 |
| JP | 2000174949 | 6/2000 |
| JP | 2000-227828 | 8/2000 |
| JP | 2000227828 | 8/2000 |
| JP | 2001-309104 | 11/2001 |
| JP | 2001309104 | 11/2001 |
| JP | 2003-084937 | 3/2003 |
| JP | 2003-091382 | 3/2003 |
| JP | 2003084937 | 3/2003 |
| JP | 2003091382 | 3/2003 |
| JP | 2003-209659 | 7/2003 |
| JP | 2003236660 | 7/2003 |
| JP | 2003-241931 | 8/2003 |
| JP | 2003241931 | 8/2003 |
| JP | 2003-271286 | 9/2003 |
| JP | 2003271286 | 9/2003 |
| JP | 2004310154 | 11/2004 |
| JP | 2005-115683 | 4/2005 |
| JP | 2005115683 | 4/2005 |

* cited by examiner

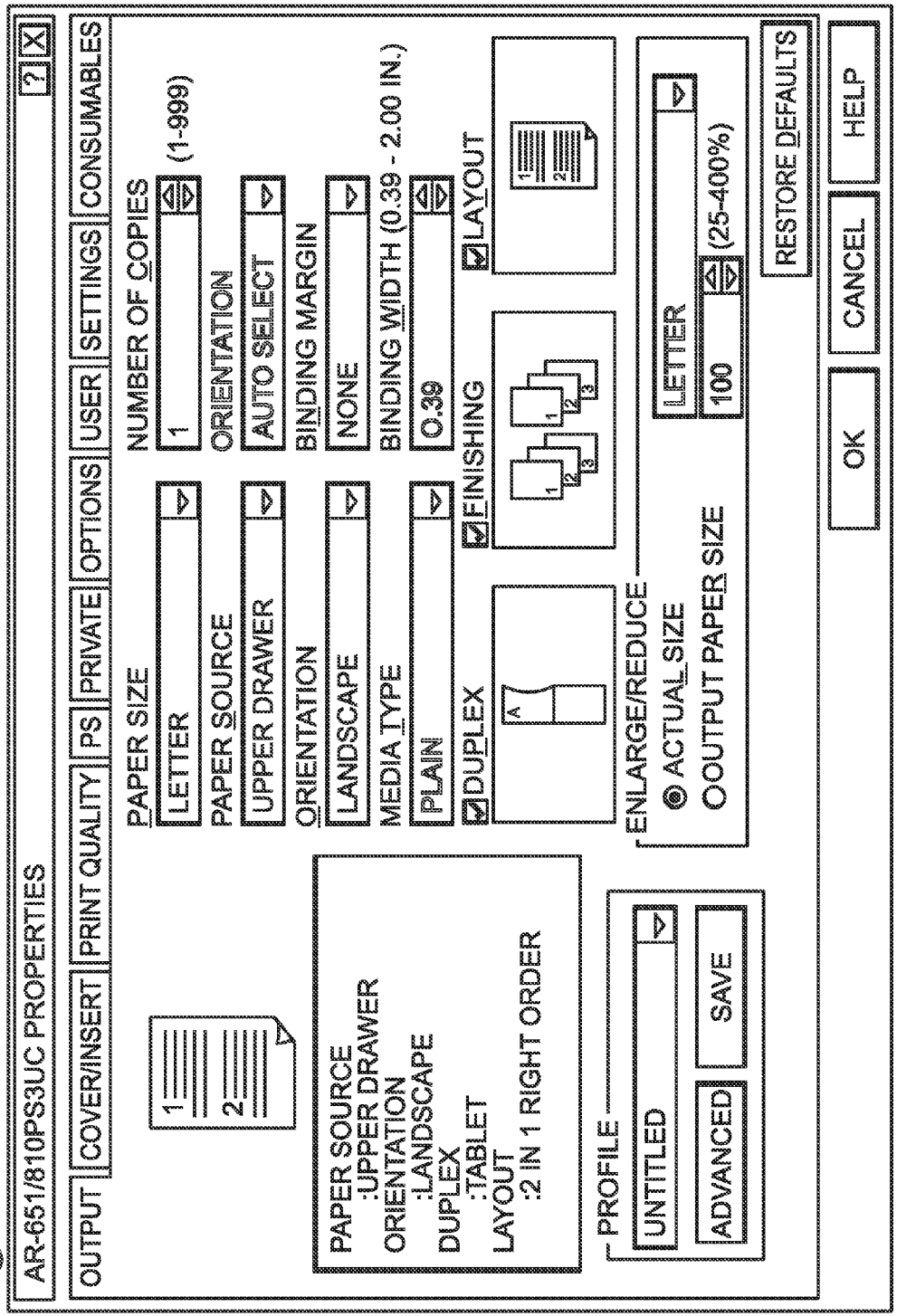
Fig. 1C *(PRIOR ART)*

Fig. 1D *(PRIOR ART)*
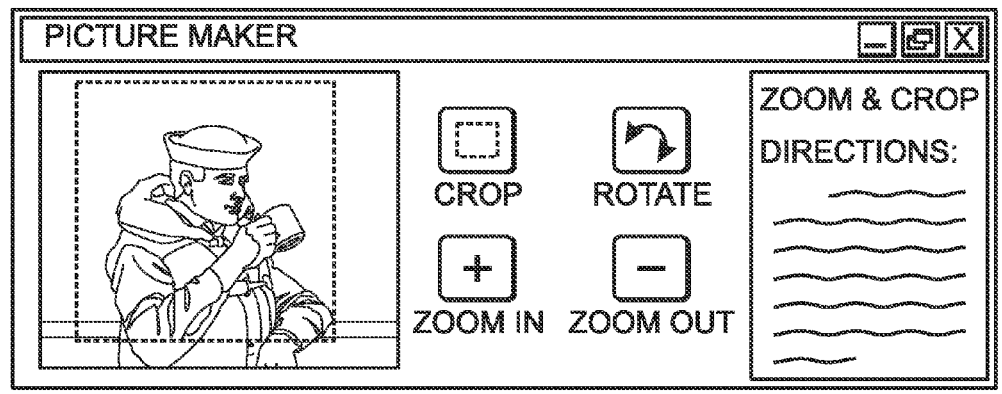
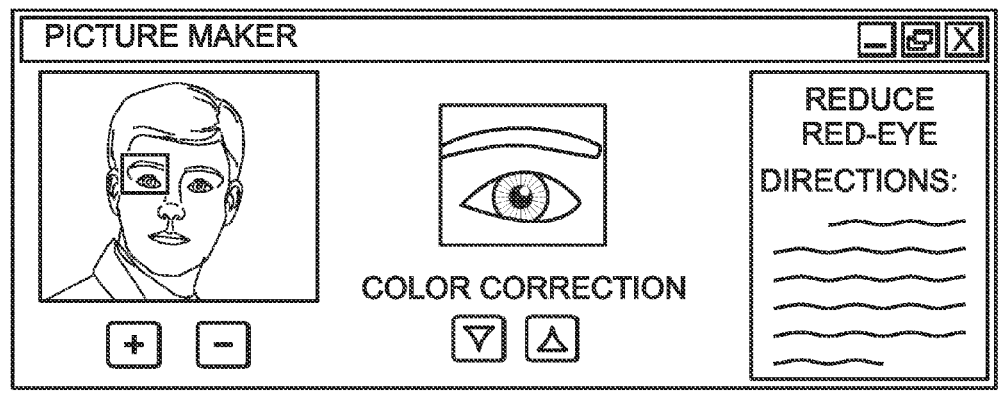
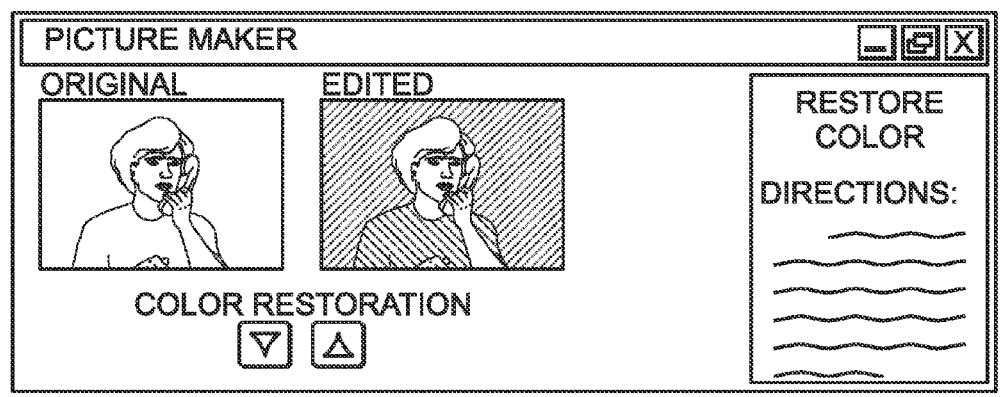

STAPLING SYMBOLS

HOLE PUNCH SYMBOLS

FOLDING SYMBOLS

CUTTING SYMBOLS

ORIENTATION SYMBOLS

FRONT / BACK COVERS

PAPER SIZE

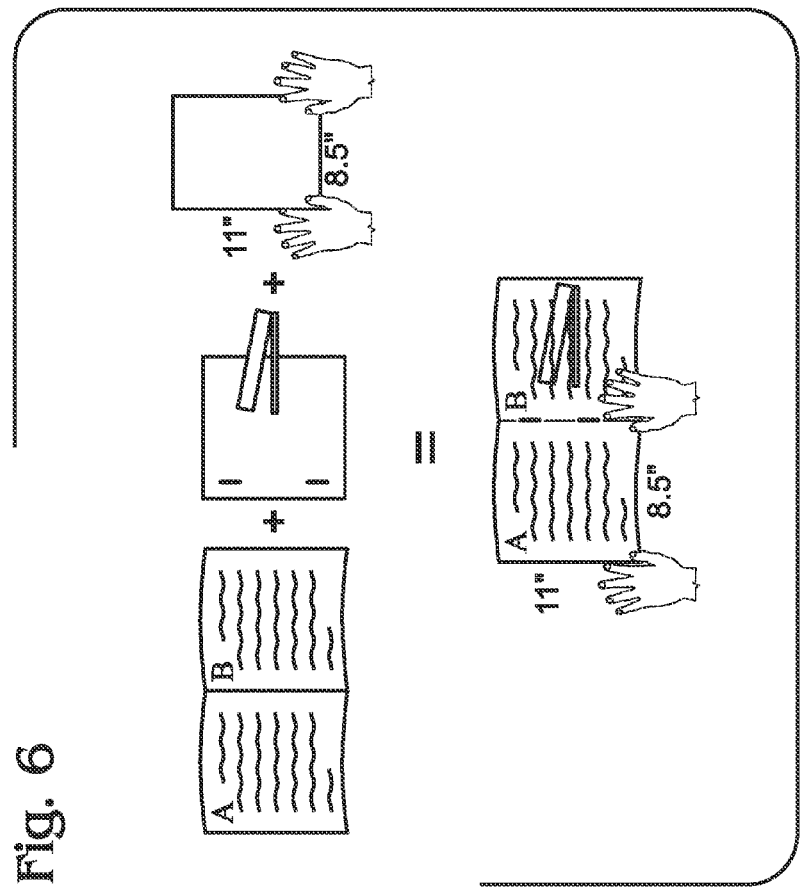
Fig. 6
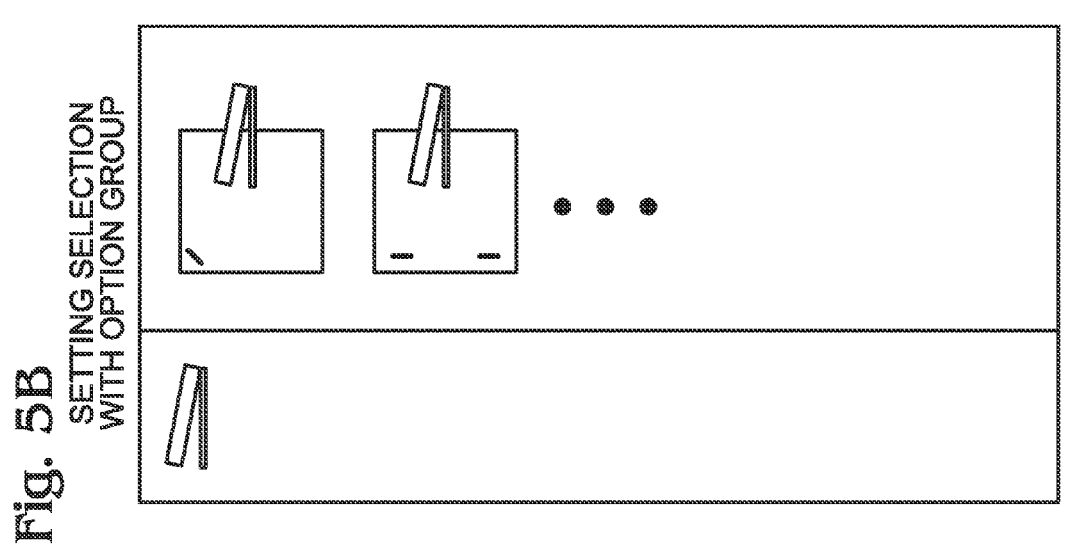
Fig. 5B SETTING SELECTION WITH OPTION GROUP

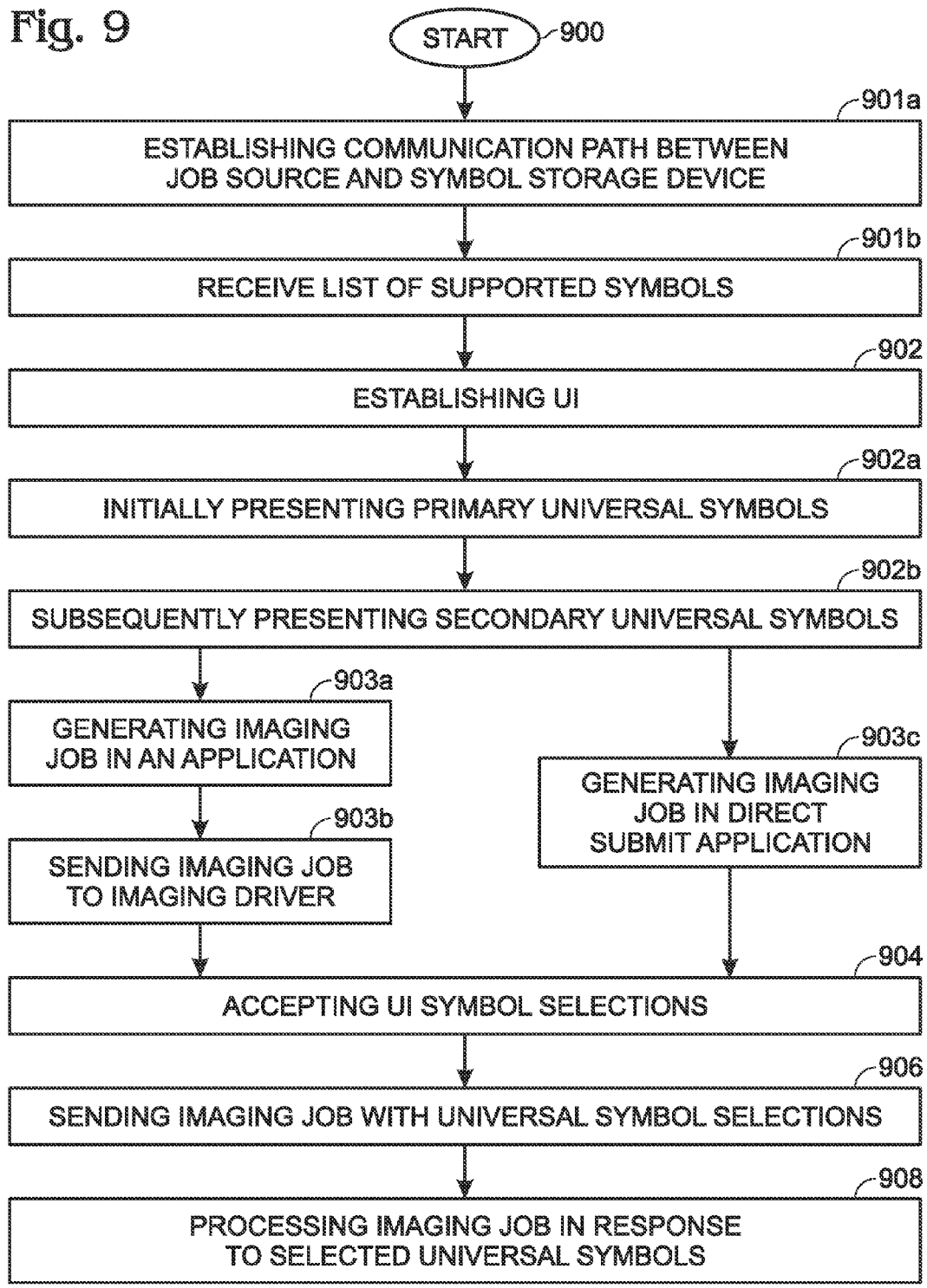

ADAPTIVE UNIVERSAL SYMBOL DRIVER INTERFACE

BACKGROUND OF THE INVENTION

1. Field of the Invention

This invention generally relates to digital image processing and, more particularly, to a system and method for using universal symbols to adaptively represent, at an image driver interface, the complete gamut of processing options.

2. Description of the Related Art

When a user chooses to print a document or image to an unfamiliar printing device, the user must be able to visually distinguish between the choice of options presented on the printer user interface. That is, the user must conceptualize how the output is to look (i.e., 2-sided or stapled in the corner). The user must, then, find a correspondence between the options displayed in the user interface and their conceptualization.

This correspondence issue can be particularly problematic with users who are not familiar with the natural (human-spoken) language of the user interface. For example, a foreign visitor at a domestic work site may desire to print a document/image from a computing host, such as a desktop computer, to a printer local to the site. If the foreign worker is unfamiliar with the natural user interface language (e.g., English) used by the printer driver on the host, it maybe very confusing to operate. Manufacturers can produce a multi-language printer driver to alleviate this problem. But this solution greatly increases manufacturing costs, introduces translation errors, and results in a long list of languages that need support.

FIG. 1A depicts a conventional printer driver user interface, where all the selections are textual based (prior art). This type of interface requires that the operator to be both proficient in the natural language of the interface, and be able to associate the selection phrases with a corresponding output.

FIG. 1B depicts a conventional printer driver user interface (UI) with some graphical display (prior art). All the selections are still textual based, but the outcomes of the selection options are represented with a graphical display. For example, the display can be a "stack of paper" icon. The representation of the stack of paper dynamically changes to represent the application of a selection. For example, if the user chooses stapling, staples may appear on the corresponding edges of the paper stack represented in the icon. While this is an improvement over the strictly textual representation, it is still difficult to use for someone not proficient in the natural language, or unfamiliar with the textual phrases. In this case, the user must find the selections corresponding to the desired output by trial and error.

FIG. 1C depicts a conventional printer driver UI, where the settings of some print options are graphically represented (prior art). Typically, each option group (staple, punch, layout) is textually selected. Once selected, various icons are displayed to represent the selectable settings in the group. For example, if the user selects a checkbox labeled 'Staple', the user may be presented with another dialog containing several iconic representations of a stack of paper, each showing a different staple configuration. The user then chooses one of the icons.

While this UI is an improvement to some aspects, it is still difficult to use for someone not proficient in the natural language, or unfamiliar with the textual phrases, in that it is still heavily textual driven, and the outcome of multiple selections is not graphically displayed, so that the user is uncertain of the result. Further, the icons are hard-coded in the printer driver for use with a particular corresponding manufacturer/model of printer. The hard-coded options are inapplicable to other printer models (with different options), or obsolete if the corresponding printer is upgraded.

FIG. 1D depicts a graphical UI from an automated photo kiosk (prior art). More specifically, a kiosk UI is shown that is used for walkup printing of still photos or digital images supplied from a digital camera memory stick. A user places a still photo (or extracts an image from a memory stick) on the platen and scans it. The UI system then leads the user through a sequence of screens, one at a time. Each screen represents an option that either manipulates the image data (e.g., cropping or red-eye removal), or placement on the output sheet (e.g., border or n-up). Each option screen presents multiple icons, where each icon is a graphical representation of a setting. Additionally, when the user selects an icon, the effect of applying the setting is simulated on the display.

This method still has shortcomings in that it is limited to a walkup device interface, as opposed to being host-side driven. Further, the kiosk UI operates with only a single image, not multiple page data or general paper handling operations associated with multiple page data (e.g., duplex or booklet). Neither does the system handle general finishing operations, such as staple, punch, trim, fold, or cut.

The screens are seen in a sequential order. Therefore, all the option categories cannot be seen at one time. The user must select option/settings in the predefined order. The user must remember which options they selected, once they move to the next screen. Thus, while this graphic interface is suitable for single-picture images, it is inadequate as a printer driver or host-side print operations.

Therefore, there is a need for an effective method for users who are not proficient in the natural language, or unfamiliar with the textual phrases associated with a printer, to recognize and select settings from a printer driver that correspond to their desired output.

It would be advantageous if an imaging driver user interface existed that could represent all the possible options available regardless of the user's natural language.

It would be advantageous if an imaging driver had a completely graphical UI, where job options and job selections were represented by a symbol, universally recognized and independent of any natural language.

It would be advantageous if the above-mentioned universal symbols could be redefined adaptively for use with different imaging devices, to correctly represent available options.

SUMMARY OF THE INVENTION

The present invention describes an effective method for users who are not proficient in the natural language (e.g. English) or the operating environment, or unfamiliar with the textual phrases associated with an imaging device, to recognize and select job option settings from an imaging driver (i.e., printer driver) UI. The settings of the imaging device are selected through the use of universal symbols, such as graphical icons. The UI display includes two sections. The first section is a palette of universal symbols that are grouped to represent options and associated settings. The second section is a drop zone. The user selects print settings by dragging the icons from the palette and dropping them into the drop zone. The drop zone performs two visual tasks for the user. It provides a display of the selected icons, and graphical simulates the application of the selected icons (i.e., settings).

In another aspect, the imaging driver, or a direct submit application such as direct print, is generic and unaware of imaging device-specific settings. In this aspect, the imaging driver uploads supported universal symbols and any appellate code that simulates their application. The imaging driver makes no interpretation of the meaning of the symbols and only uses them to operate the user interface. Upon initiating the imaging operation, the imaging driver outputs imaging device-ready data as logical pages and downloads the data with the user's selected symbols. An imaging device controller, based on the selected symbols, performs the necessary operations to convert the logical pages into outputted pages, such as hard-copy or soft-copy.

Accordingly, a method is provided for processing an imaging job using adaptive universal symbols. The method comprises: establishing a user interface (UI) representing imaging job options with adaptive universal symbols at a job source, which can be an imaging driver or a direct submit application; accepting adaptive universal symbol selections from the UI; sending an imaging job to an imaging device, in an imaging device-specific format, along with the adaptive universal symbol selections; and, at the imaging device, processing the imaging job in response to the selected adaptive universal symbols.

Establishing a UI representing imaging job options with adaptive universal symbols includes cross-referencing adaptive universal symbols to print, scan, fax, copy, medical imaging, document/image archive/retrieval, manipulation/conversion, or transfer type of job options. With respect to print, copy, or fax jobs for example, the adaptive universal symbols may represent options such as staple, cut, fold, hole-punch, trim, N-up, duplex, paper size, input tray, output bin, copies, collation, margin, sheet/page orientation, or front/back covers.

In one aspect the method further comprises: establishing a bi-directional communication path between the job source and a symbol storage device; and, receiving a list of supported adaptive universal symbols from the symbol storage device at the job source. Then, establishing a UI at a job source includes establishing a UI in response to the list of supported symbols. The list of supported adaptive universal symbols may be received when the job source is configured to communicate with the imaging device, in response to imaging device-related events, or dynamically with the submission of each imaging job.

Typically, the establishment of a UI representing imaging job options with adaptive universal symbols includes: initially presenting a group of primary adaptive universal symbols; and, subsequently presenting a group of secondary adaptive universal symbols, logically related to a selected primary adaptive universal symbol. In one aspect, the job source receives adaptive universal symbol appellate code with the list of adaptive universal symbols, and uses the appellate code to determine potential secondary adaptive universal symbol selections associated with each primary adaptive universal symbol. Then, the job source generates the secondary group of adaptive universal symbols after a primary adaptive universal symbol is selected. In some cases, the selection of a secondary symbol may lead to the generation and display of additional primary symbols.

Alternately, the job source sends a selected primary adaptive universal symbol to the imaging device, and the imaging device dynamically generates secondary adaptive universal symbols logically related to the selected primary adaptive universal symbol. Then, the imaging device sends the generated secondary adaptive universal symbols to the job source UI for presentation.

Additional details of the above-described method and a system for processing an imaging job using adaptive universal symbols are presented below.

BRIEF DESCRIPTION OF THE DRAWINGS

FIG. 1C depicts a conventional printer driver UI, where the settings of some print options are graphically represented (prior art).

FIG. 1D depicts a graphical UI from an automated photo kiosk (prior art).

FIGS. 5A and 5B illustrate exemplary palettes of adaptive universal symbols.

FIG. 6 depicts an exemplary dynamic graphical representation of selected job options.

FIG. 9 is a flowchart illustrating the present invention method for processing an imaging job using adaptive universal symbols.

DETAILED DESCRIPTION OF THE PREFERRED EMBODIMENTS

Figure 1A:
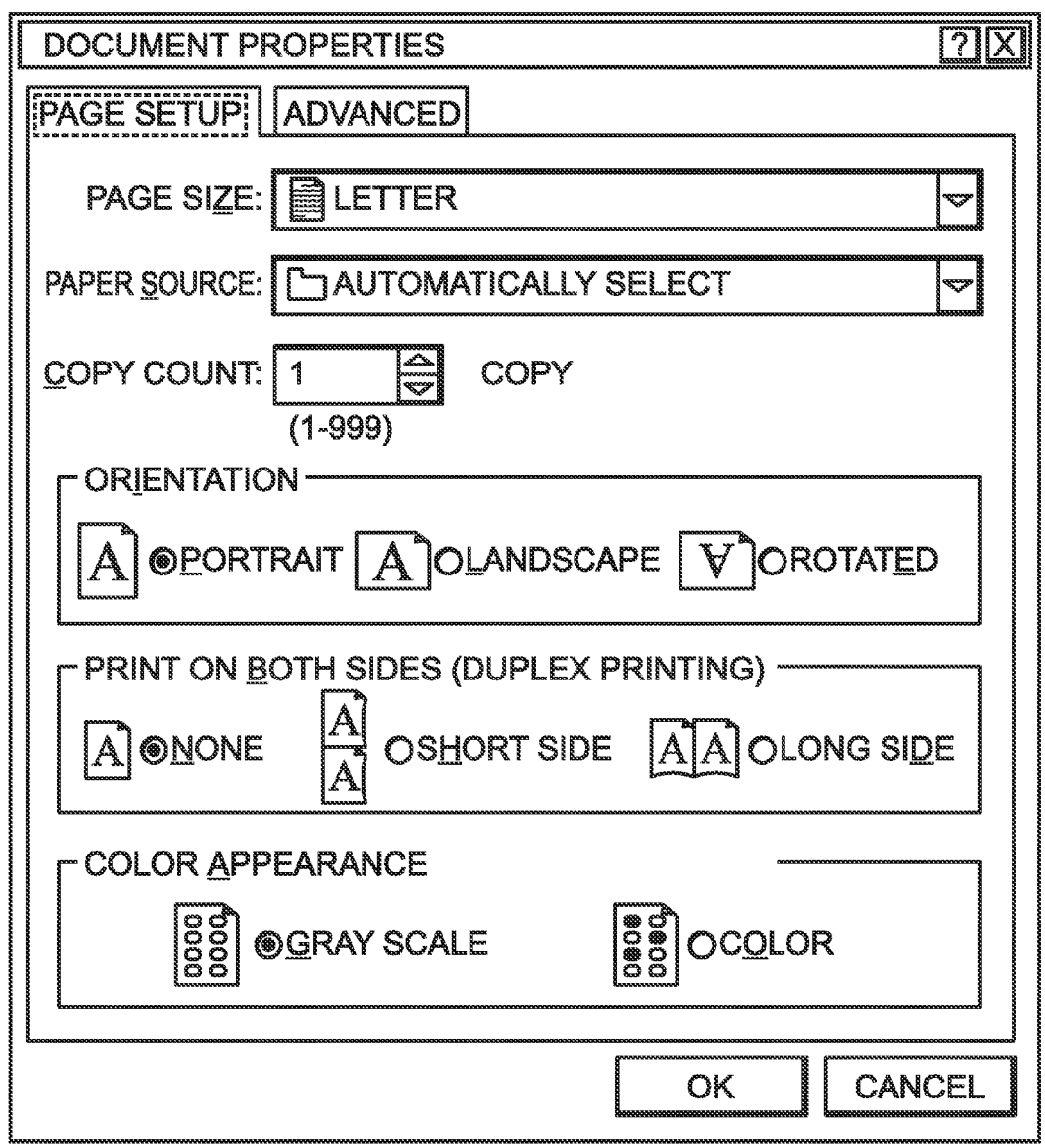
FIG. 1A depicts a conventional printer driver user interface, where all the selections are textual based (prior art).
Figure 1B:
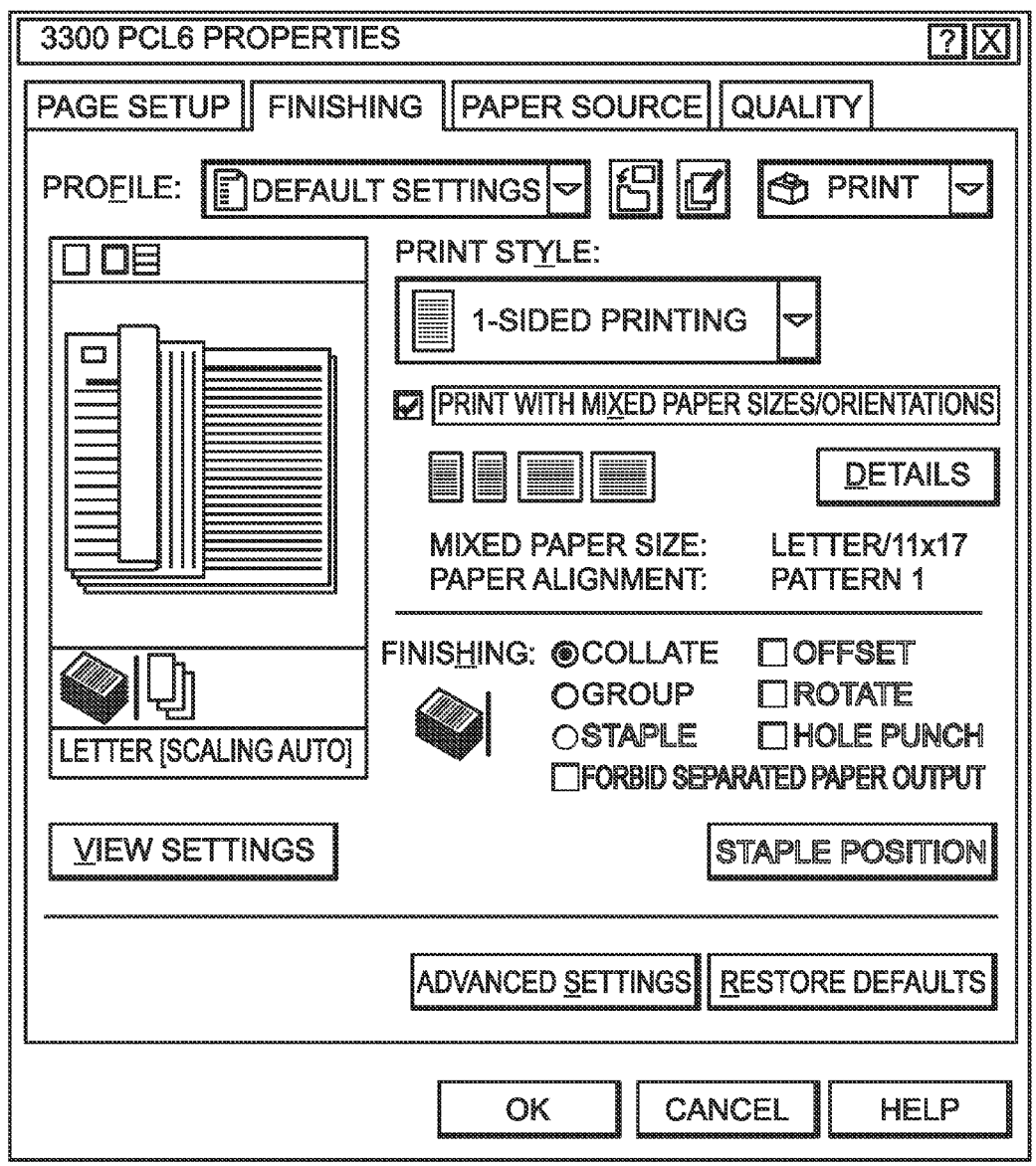
FIG. 1B depicts a conventional printer driver user interface (UI) with some graphical display (prior art).
Figure 2:
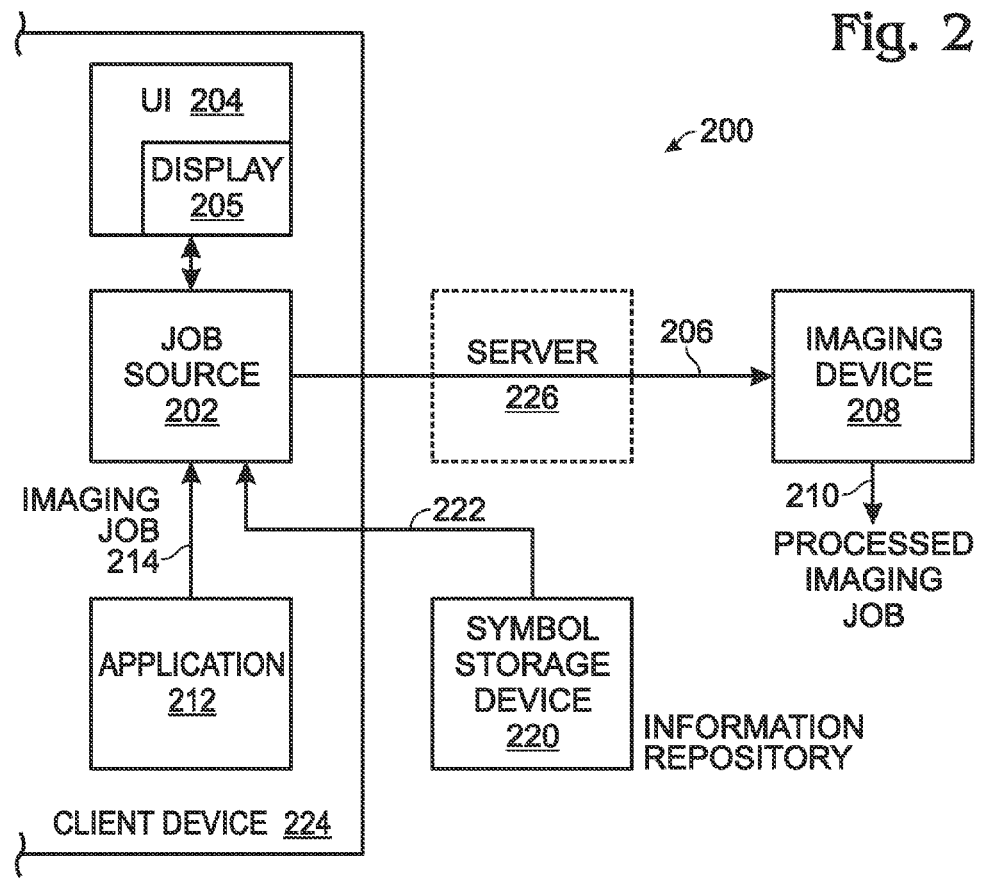
FIG. 2 is a schematic block diagram of the present invention system for processing an imaging job using adaptive universal symbols.

FIG. 2 is a schematic block diagram of the present invention system for processing an imaging job using adaptive universal symbols. The system 200 comprises a job source 202 having a user interface (UI) 204 for presenting imaging job options represented with adaptive universal symbols. The UI also accepts adaptive universal symbol selections. The job source UI 204 may include a display 205 for presenting a palette with adaptive universal symbol options and a drop zone for selected adaptive universal symbols. A keypad, touchscreen, mouse, or the like (not shown) may be used for selecting the displayed options.

The job source 202 has an interface on line 206 for sending an imaging job in an imaging device-specific format, along with the adaptive universal symbol selections. An imaging device 208 has an interface on line 206 to accept the imaging job and adaptive universal symbol selections. Line 206 may represent a local or network, wired or wireless connection, such as WiFi, Bluetooth or IrDa. An imaging server 226 may be interposed between the job source 202 and the imaging device 208. The imaging device 208 has an interface on line 210 to supply the imaging job processed in response to the selected adaptive universal symbols. The job source 202 may send the imaging job to the imaging device 208 in an imaging device-specific format such as a renderer-independent format. Tagged image file format (TIFF), JFIF, or JPEG encoded images are examples of a renderer-independent format.

As used herein, the job source 202 and the imaging device 208 can both be considered rendering devices, as one generates device-ready data and the other generates the final output. TIFF is an example of a format that is both renderer independent and device specific. In other aspects, the imaging job can be in a renderer-dependent format such as a page description language (PDL). PostScript (PS) and printer control language (PCL) are examples of PDL. HP PCL, HP PCLXL, Adobe Postscript, Adobe PDF, and IBM IPDS are also examples of PDL. Fax formats, such as G3 and G4, are examples of device-specific formats. In one aspect, the imaging job may be additionally wrapped in a format independent job control language such as HP Printer Job Language (PJL). In a different aspect, the imaging job can be in an imaging device-ready format such as a raster bitmap.

As used herein, a "universal symbol" is a graphical representation or icon that is used to represent an action or function associated with imaging, without the use of any text. That is, a universal symbol is a non-text graphic. A universal symbol may include symbols that are already known or recognized, or symbols that have yet to gain universal recognition. It is intended that the entire gamut of imaging job selections, functions, and results be represented with a corresponding universal symbol, and that new symbols be added to correspond with new selections/functions. Although the options are represented graphically, in some aspects text may accompany the symbols.

The symbol is adaptive because it is not hard-coded, but rather, uploaded for use with respect to the targeted imaging device. That is, the adaptive universal symbols are adaptive for use with a selected target. Unlike the prior art discussed in the Background Section above, which uses graphic symbols that are hard-coded to specific control sequences, the present invention adaptive universal symbols are more generic. That is, the adaptive universal symbols can be used with a broader range of printers, since the symbols are uploaded from the imaging device (or associated symbol storage device). For this reason, the present invention adaptive universal symbols are referred to as adaptive universal symbols.

The job source 202 can be an imaging driver or a direct submit application. Two common examples of an imaging driver are a printer driver and a fax driver, in which case the imaging device can be a printer, fax machine, or multifunctional peripheral (MFP), which has both print and fax capabilities. In one aspect, the system 200 further comprises an application 212 having an interface on line 214 to supply a generated imaging job. Examples of applications include MS-Word, MS-Excel, MS-PowerPoint, and MS-Paint, or digital image processing applications such as, Adobe Photoshop, ImageReady, Adobe Illustrator, or FrameMaker. In this scenario, the job source 202 is an imaging driver having an interface on line 214 to accept the imaging job from the application 212 for processing. Alternately, if the job source 202 is a direct submit application, it generates the imaging job without the need for an imaging driver.

Generally, the imaging device 208 is a printer, scanner, fax, copier, document/image repository, X-ray machine, electronic whiteboard, Internet publishing device, or magnetic resonance imaging (MRI) device. However, this is not an exhaustive list of imaging devices that could benefit from the use of a UI based upon adaptive universal symbols. For example, if imaging device 208 is a printer, copier, or fax, then the job source UI 204 may cross-reference adaptive universal symbols to print, copy, and fax job options such as staple, cut, fold, hole-punch, trim, N-up, duplex, paper size, input tray, output bin, copies, collation, margin, sheet/page orientation, or front/back covers. This is not an exhaustive list of every possible type of printer/copier/fax job option.

If the imaging device 208 is a scanner, the job source UI 204 may cross-reference adaptive universal symbols to scan job options such as resolution, clipping, output format, image orientation, OCR, color space, or compression format. If the imaging device is document/image repository, then the job source UI 204 may cross-reference adaptive universal symbols to document/image repository options such as conversion format, source and destination, access rights, encryption, encoding, meta-data, or filtering. Again, these are not exhaustive lists.

In one aspect, the system 200 further comprises a symbol storage device 220 having an interface on line 222 to supply a list of supported adaptive universal symbols. The job source 202 has an interface on line 222 to receive the list of supported adaptive universal symbols from the symbol storage device 220. The symbol storage device 220 can be the imaging device 208, a client device 224, an imaging server 226, or an information repository (as shown).

The job source UI 204 presents adaptive universal symbols from the list of supported symbols. The job source 202 may receive the list of supported adaptive universal symbols from the symbol storage device 220 when the job source 202 is configured to communicate with the imaging device 208, either initially or when system reconfigurations are installed. Alternately, the job source 202 may receive the list in response to imaging device-related events, such as the addition of a new job option to the imaging device, or dynamically with the submission of each imaging job.

Typically, the job source UI 204 initially presents a group of primary adaptive universal symbols, and subsequently presents a group of secondary adaptive universal symbols, logically related to a selected primary adaptive universal symbol. For example, if "stapling" is selected as a primary job option, the UI 204 may graphically present secondary job options such as (staple) right corner, left corner, and center.

In one aspect the job source 202 receives the list of supported adaptive universal symbols from the symbol storage device 220, with adaptive universal symbol appellate code. The job source UI 204 uses the appellate code to determine potential secondary adaptive universal symbol selections associated with each primary symbol, and generates the secondary group of adaptive universal symbols after a primary symbol is selected. For example, after the "stapling" primary job option is selected, the UI 204 uses the appellate code to determine which secondary job options to present. That is, the UI 204 determines the secondary job options supported by imaging device 208.

Alternately, the job source 202 sends a selected primary adaptive universal symbol to the imaging device 208. The imaging device 208 dynamically generates secondary adaptive universal symbols logically related to the selected primary adaptive universal symbol. That is, the imaging device 208 determines the secondary job options that it can support. The imaging device 208 sends the generated secondary adaptive universal symbols to the job source UI 204 for presentation.

Functional Description

Exemplary Operating Environment

In one exemplary operating environment, an application such as MS-Word supports printing to a device using a graphical device interface (GDI), such as in Microsoft Windows. In this environment, the user initiates a print job from the application. The application converts the application specific data (i.e., native format of document/image) into device independent data that conforms to the GDI. The GDI interface passes the device independent data to a printer driver, which converts the device independent data into printer ready data.

As part of this process, the application/GDI interface, in conjunction with the printer driver, displays to the user an interface for specifying print settings specific to the print job. These print settings are then interpreted by the printer driver to either perform specific imaging operations, or are converted into printer control commands to perform specific printer operations in the printing device.

In another aspect, a document/image is directly submitted (i.e., in its native format) to a printing device for direct printing, without conversion by a printer driver. Typically, this is done through a direct submit application. As part of this process, the direct submit application displays to the user an interface for representing print settings specific to the print job. These print settings are then interpreted by the direct submit application to either perform specific imaging operations, or are converted into printer control commands to perform specific printer operations in the printing device.

General Layout of UI

In one exemplary UI, the imaging driver (or direct submit) user interface, enabled as a printer driver, is composed of two primary sections:

1. Print Option/Setting Palette
2. Selection Drop Zone.

The print option/setting palette includes groupings of graphical representations (e.g., icons) of option groups and corresponding settings. The graphical representations are universally recognizable by individuals from different regions and cultures of the world, and are referred to herein as adaptive universal symbols.

Figure 3:
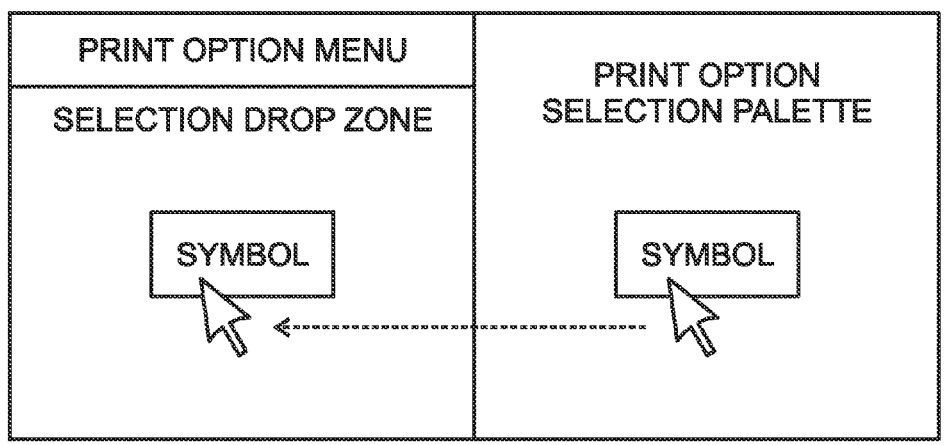
FIG. 3 is a diagram representing a adaptive universal symbol selection process.

FIG. 3 is a diagram representing a adaptive universal symbol selection process. The user selects a adaptive universal symbol corresponding to a print setting from the palette, and drag n' drops the adaptive universal symbol to the selection drop zone. The selection drop zone maintains a copy of each selected adaptive universal symbol. The selection of symbols from the palette, to the drop zone, may be performed by operations other than drag n' drop, such as, but not limited to, copy/paste.

The user may additionally unselect a print setting from the selection drop zone, by, but not limited to:

1. Deleting the adaptive universal symbol from the drop zone.
2. Dragging the adaptive universal symbol back to the palette.
3. Replacing the initially selected symbol with another adaptive universal symbol from the same option group. For example, the simplex option may be replaced by duplex-book option.

Additionally, the selection drop zone maintains a graphical representation of the output, such as showing a icon representing a stack of paper, and dynamically modifies the graphical representation to simulate the application of the settings for the adaptive universal symbols in the selection drop zone.

Adaptive Universal Symbol Representations

Figure 4A:
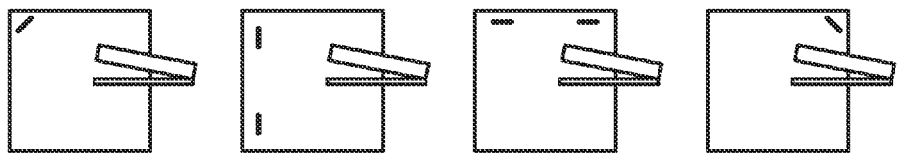
FIGS. 4A through 4C illustrate some exemplary adaptive universal symbol details.
Figure 4A:
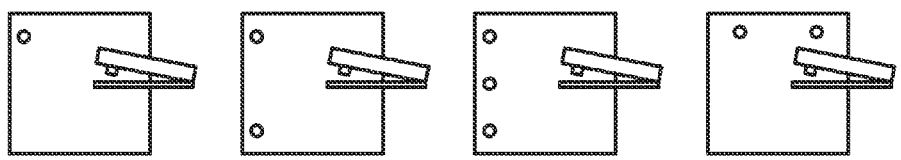
Figure 4A:
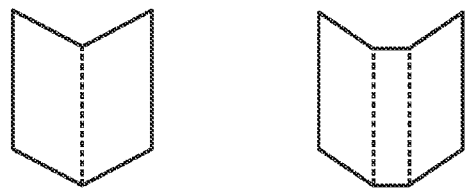
Figure 4A:
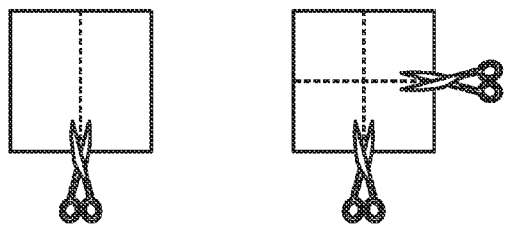
Figure 4B:
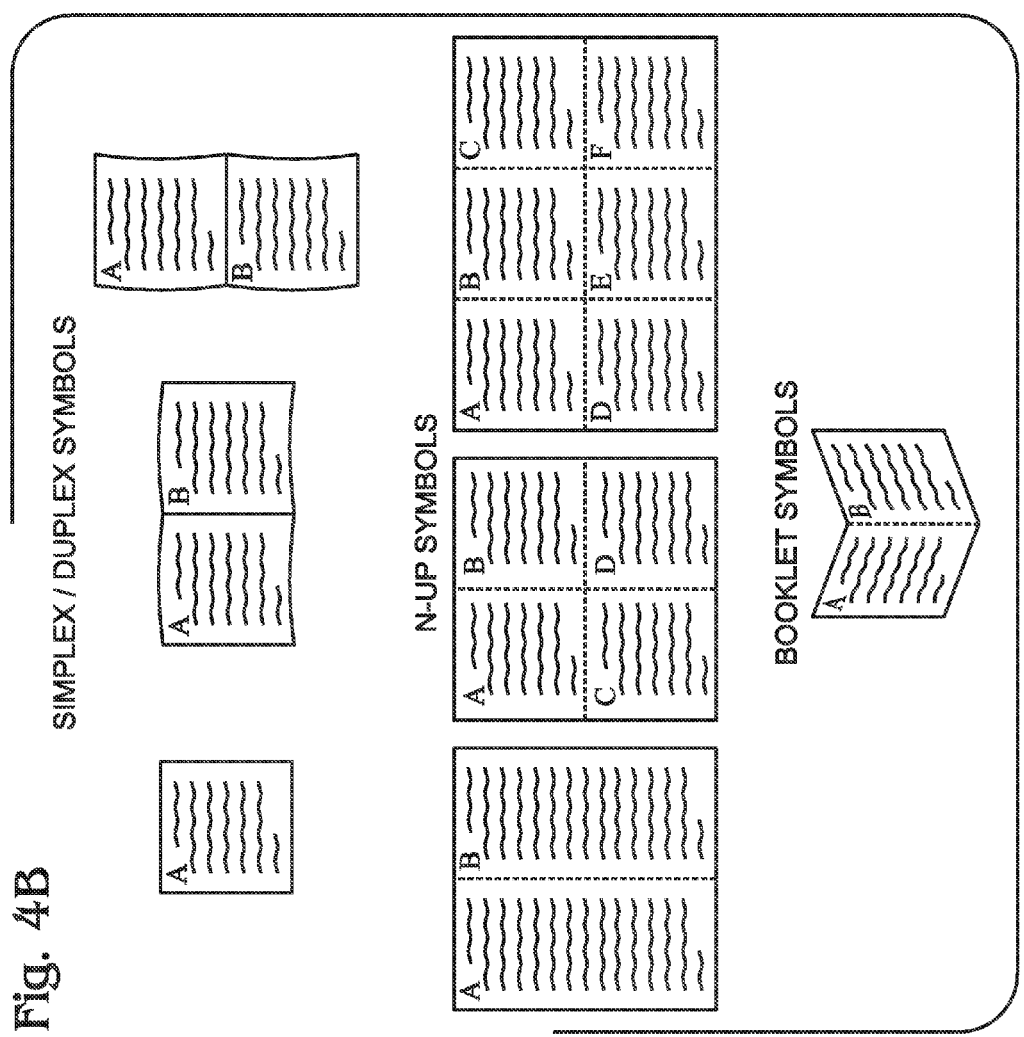
Figure 4C:
Figure 4C:
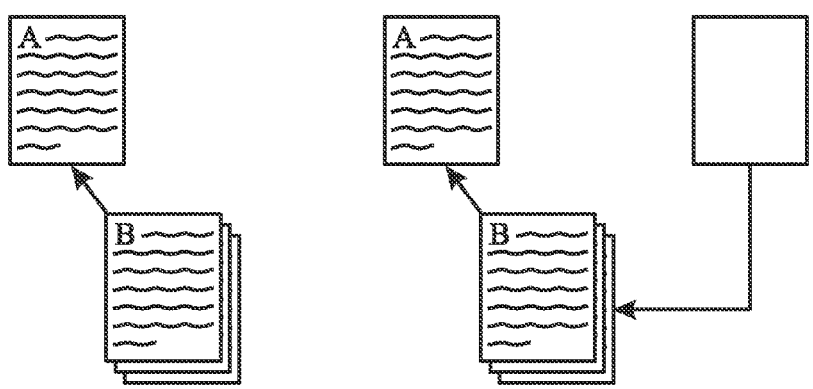
Figure 4C:
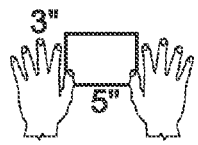
Figure 4C:
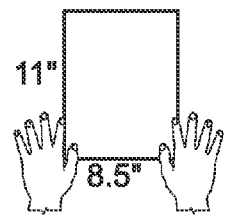
Figure 4C:
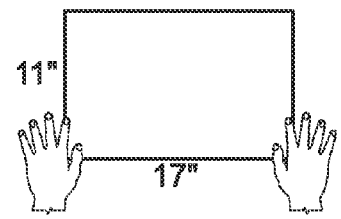

FIGS. 4A through 4C illustrate some exemplary adaptive universal symbol details. Each option group includes a (primary) adaptive universal symbol that represents the option group, and one or more (secondary) adaptive universal symbols that represent the settings within the option group.

For example (see FIG. 4A), the adaptive universal symbol for the stapling option group may depict a stapler next to a stack of paper. The adaptive universal symbol for each setting may depict staple mark(s) on the stack of paper representing the number/placement of the staples.

Palette Selection

Figure 5A:
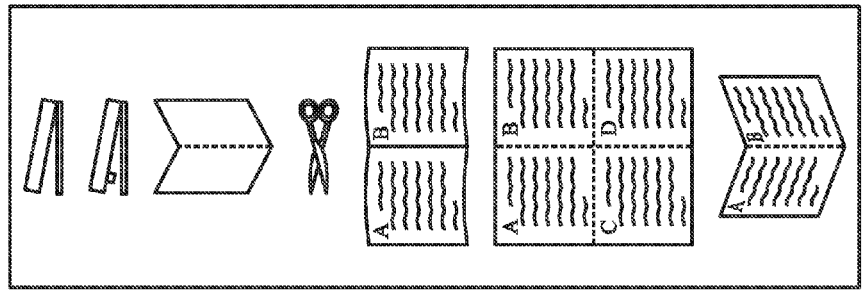

FIGS. 5A and 5B illustrate exemplary palettes of adaptive universal symbols. The user selects print, or other imaging operations such as fax and scan, from the option/setting palette. This palette includes a adaptive universal symbol for each option group that a user recognizes as being associated with a related imaging operation, such as paper selection, stapling, or duplex.

Additionally, the UI may conserve space by hiding the secondary adaptive universal symbols associated with an option, until the option is actually selected. For example, until the button is clicked on adaptive universal symbol representing the option group. Further, only a subset of the option group adaptive universal symbols may be shown, and the user may scroll to view the other symbols.

Selection Drop Zone

FIG. 6 depicts an exemplary dynamic graphical representation of selected job options. In one aspect, the selection drop zone visually maintains the user's selections by displaying the adaptive universal symbols that have been selected. The user may deselect settings from the drop zone as described earlier. Additionally, the drop zone can maintain a graphical representation of the application of the currently selected settings. The graphical representation dynamically changes as the user changes settings. For example, if the user selects a page size, duplex printing, and left edge double stapling, the graphical representation may appear as follows:

1. Initially, as the paper size icon;
2. Then, the sheet of paper in the paper size icon is replaced with the duplex icon, where each sheet in the duplex icon is replaced with the paper sheet component in the paper size icon; and,
3. Finally, the binding edge component in the duplex icon is replaced with the staple-binding component from the stapling icon.

The above-described dynamic construction can be accomplished by breaking the adaptive universal symbols into components, and applying rules for component combination. Examples of components include, but not limited to: Paper sheet; binding edge; binding component; logical edges (e.g., folding margins); and, logical pages.

For example, if an icon is made up of multiple same-size paper sheets, and the paper sheet selection changes, then each paper sheet in the icon is replaced with the paper sheet component from the paper size selection.

Likewise, if a binding operation is specified, the binding edge of the icon is set to the binding edge of the binding selection, and the binding component from the binding selection is placed on the binding edge of the icon.

Some conflicting combinations can also be detected. For example, the system can impose a rule that only one binding component can be placed on a binding edge. Thus, if a user selects hole punch and staple for the same edge, the user interface flags an error to the user.

Generic Printer Driver or Direct Submit Application

Figure 7A:
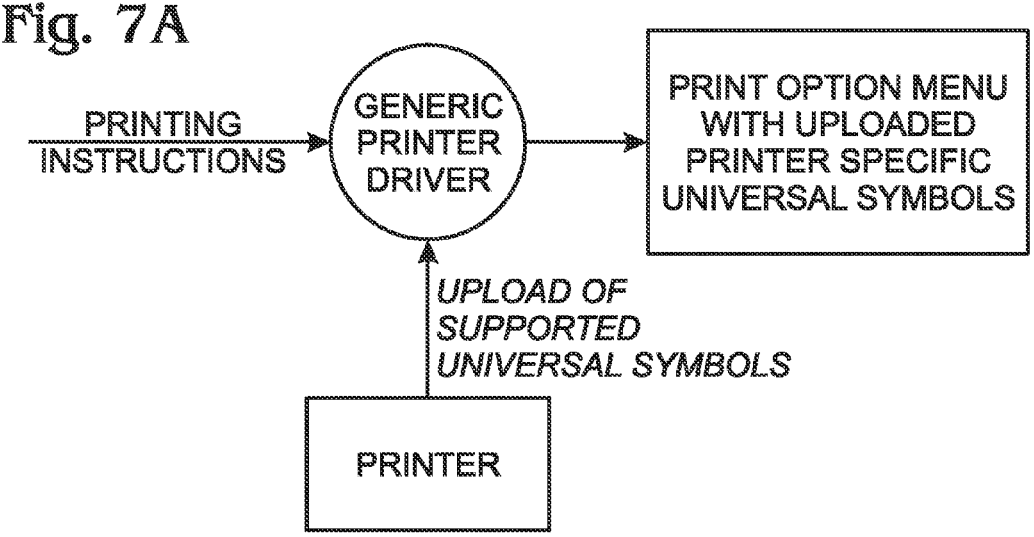
FIGS. 7A and 7B depict the present invention imaging driver enabled as a printer driver.
Figure 7B:
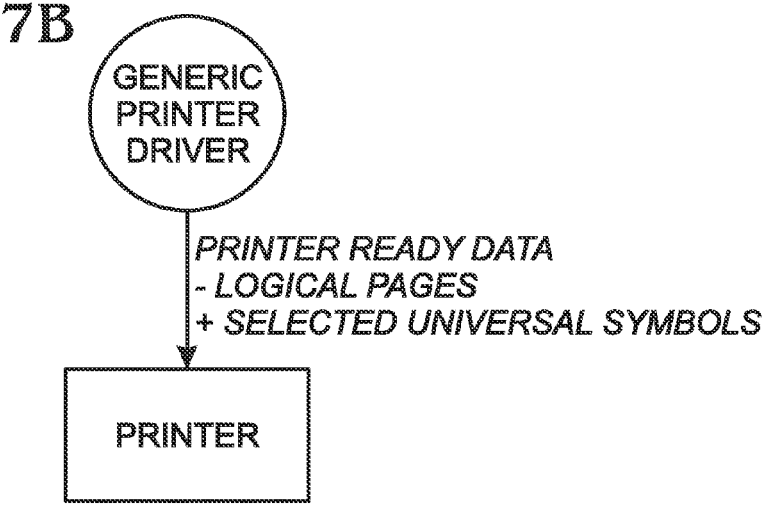

FIGS. 7A and 7B depict the present invention imaging driver enabled as a printer driver.

Figure 8A:
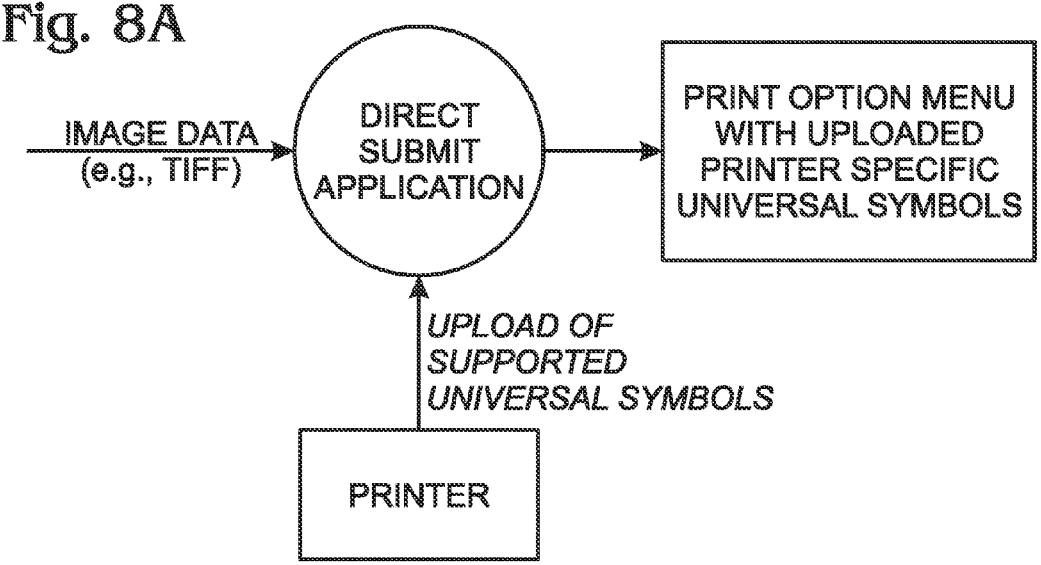
FIGS. 8A and 8B depict the present invention imaging driver enabled as a direct submit application.
Figure 8B:
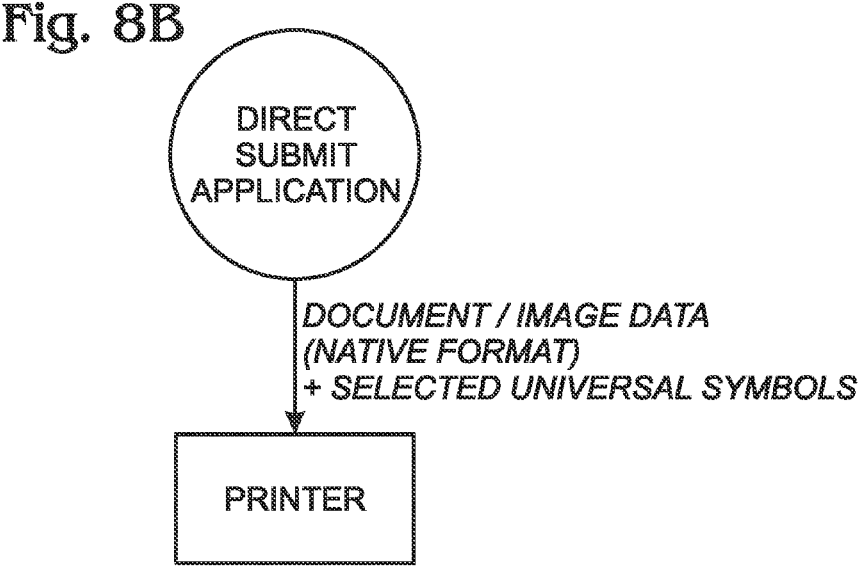

FIGS. 8A and 8B depict the present invention imaging driver enabled as a direct submit application. In these examples, the adaptive universal symbol UI is implemented using a generic printer driver or direct submit application that is independent of the printing device (i.e., has no knowledge of the device's capabilities or control sequences). In this method, the driver or application can generate a print (e.g., PS) or image (e.g., TIFF) data stream for logical pages in a format that is compatible with the device.

The driver or application is able to establish a bi-directional communication path between itself and the device, such as using TCP/IP for the transmission protocol and XML for the data layer. Embedded in the device is a collection of adaptive universal symbols for options/settings supported by the device's controller. Both the driver (or application) and the device support a communication interface between themselves for querying and receiving the device's supported options/settings as adaptive universal symbols.

The driver, or application, uploads the adaptive universal symbol groups and symbols from the device and uses the symbols to populate the option/setting palette. Additionally, the driver may upload appellate code from the device for combining the symbols in the selection drop zone. In an alternate aspect, the driver passes the symbols, or references to symbols in the drop zone, back to the imaging device. The device performs the dynamic icon construction and sends the results back to the driver for display.

Finally, when the user completes the option/setting selection and initiates the print job, the driver (or application) downloads to the device the logical pages in print or image data format, along with the adaptive universal symbol selections, such as passing a reference code to the symbols.

The driver (or application) may upload the adaptive universal symbols from the device, or symbol storage device when, but not limited to:

1. Upon initial installation/configuration;
2. Upon reconfiguration;
3. Upon a device-related event, such as when a new option is installed; or,
4. Dynamically, for each job.

FIG. 9 is a flowchart illustrating the present invention method for processing an imaging job using adaptive universal symbols. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 900.

Step 902, at a job source, establishes a UI representing imaging job options with adaptive universal symbols. For example, Step 902 may provide a display presenting a palette for adaptive universal symbol options and a drop zone for selected adaptive universal symbols. Step 904 accepts adaptive universal symbol selections from the UI. Step 906 sends an imaging job to an imaging device, in an imaging device-specific format, along with the adaptive universal symbol selections. Step 908, at the imaging device, processes the imaging job in response to the selected adaptive universal symbols.

Sending the imaging job to an imaging device, in an imaging device-specific format, in Step 906 may include sending the imaging job in a format such as a renderer-independent format (i.e., TIFF or JPEG encoded images), or a renderer-dependent format such as a page description language (PDL), as described above. Alternately, Step 906 may send the imaging job in an imaging device-ready format such as a raster bitmap, or as an imaging job wrapped in a PJL format.

Establishing a UI at a job source in Step 902 includes establishing a UI at an imaging driver or direct submit application job source. Generally, Step 902 cross-references adaptive universal symbols to job options such as print, scan, fax, copy, medical imaging, document/image archive/retrieval, manipulation/conversion, or transfer job options. With respect to print, copy, or fax job options, adaptive universal symbols may be cross-referenced to options such as staple, cut, fold, hole-punch, trim, N-up, duplex, paper size, input tray, output bin, copies, collation, margin, sheet/page orientation, or front/back covers.

With respect to scan job options, adaptive universal symbols may be cross-referenced to options such as resolution, clipping, output format, image orientation, OCR, color space, or compression format. With respect to document/image repository job options, adaptive universal symbols may be cross-referenced to options such as conversion format, source and destination, access rights, encryption, encoding, metadata, or filtering. The present invention method is not limited to any particular type of job option.

In one aspect, Step 902 establishes a UI at an imaging driver. In this aspect Step 903a generates the imaging job in an application, and Step 903b sends the imaging job to the imaging driver for processing. Alternately, Step 902 establishes a UI in a direct submit application. Then, Step 903c generates the imaging job in the direct submit application.

In another aspect, Step 901a establishes a bi-directional communication path between the job source and a symbol storage device. The symbol storage device can be the imaging device, a client device, an imaging server, or an information repository. Step 901b, at the job source, receives a list of supported adaptive universal symbols from the symbol storage device. Then, Step 902 establishes a UI in response to the list of supported symbols.

In one variation, receiving a list of supported adaptive universal symbols from the symbol storage device in Step 901b includes receiving the list of supported symbols when the job source is configured to communicate with the imaging device, in which case Step 901b occurs before Step 906. Alternately, the list of supported symbols may be received in response to imaging device-related events, in which case Step 901b occurs before Step 906. In another variation, the symbol list is received dynamically with the submission of each imaging job, in which case Step 901b occurs after Step 906.

In another aspect, establishing a UI representing imaging job options with adaptive universal symbols in Step 902 includes substeps. Step 902a initially presents a group of primary adaptive universal symbols. Step 902b subsequently presents a group of secondary adaptive universal symbols, logically related to a selected primary adaptive universal symbol.

For example, receiving a list of supported adaptive universal symbols from the symbol storage device in Step 901b may additionally include receiving adaptive universal symbol appellate code. Then, subsequently presenting a group of secondary adaptive universal symbols, logically related to a selected primary adaptive universal symbol, in Step 902b includes the job source using the appellate code to determine potential secondary adaptive universal symbol selections associated with each primary adaptive universal symbol. Step 902b also generates the secondary group of adaptive universal symbols after a primary adaptive universal symbol is selected.

In another aspect, subsequently presenting a group of secondary adaptive universal symbols, logically related to a selected primary adaptive universal symbol in Step 902b includes substeps (not shown). In Step 902b1 the job source sends a selected primary adaptive universal symbol to the imaging device. In Step 902b2 the imaging device dynamically generates secondary adaptive universal symbols logically related to the selected primary adaptive universal symbol. In Step 902b3 the imaging device sends the generated secondary adaptive universal symbols to the job source UI for presentation.

A system and method have been presented for processing an imaging job using adaptive universal symbols. Examples of job options have been presented to clarify the invention. However, the invention is not limited to just these examples. Further, the invention has been explaining in a print context, where the imaging printer is a print driver and imaging device is a printer. However, the invention has application to a broader class of imaging. Although the invention has generally been explained in the context of a Microsoft Windows (D operating system, the invention can also be practiced with subsystems of an Apple MacIntosh Operating System, Linux Operating System, System V Unix Operating Systems, BSD Unix Operating Systems, OSF Unix Operating Systems, Sun Solaris Operating Systems, HP/UX Operating Systems, or IBM Mainframe MVS and AS/400 Operating System, to name a limited list of other possibilities. Other variations and embodiments of the invention will occur to those skilled in the art.

We claim:

1. A method for processing an imaging job using adaptive universal symbols, the method comprising:
at a client device job source, establishing a user interface (UI) representing imaging job options with adaptive universal symbols as follows, where an adaptive universal symbol is defined as a non-text graphic icon representing a function associated with imaging:
establishing a bi-directional communication path between the job source and a symbol storage device external to the client device;
at the job source, receiving a list of supported adaptive universal symbols from the symbol storage device, supported by an imaging device external to the client device;
displaying the list of supported symbols;
accepting adaptive universal symbol selections from the UI;
sending an imaging job to the imaging device, in an imaging device-specific format, along with the adaptive universal symbol selections; and,
at the imaging device, processing the imaging job in response to the selected adaptive universal symbols.

2. The method of claim 1 wherein establishing a UI at a job source includes establishing a UI at a job source selected from the group including an imaging driver and a direct submit application.

3. The method of claim 1 wherein establishing a UI representing imaging job options with adaptive universal symbols includes cross-referencing adaptive universal symbols to job options selected from the group including print, scan, fax, copy, medical imaging, document/image archive/retrieval, manipulation/conversion, and transfer job options.

4. The method of claim 3 wherein cross-referencing adaptive universal symbols to print, copy, and fax job options includes cross-referencing adaptive universal symbols to options selected from the group including staple, cut, fold, hole-punch, trim, N-up, duplex, paper size, input tray, output bin, copies, collation, margin, sheet/page orientation, and front/back covers.

5. The method of claim 3 wherein cross-referencing adaptive universal symbols to scan job options includes cross-referencing adaptive universal symbols to options selected from the group including resolution, clipping, output format, image orientation, OCR, color space, and compression format.

6. The method of claim 2 wherein establishing a UI at a job source includes establishing a UI at an imaging driver;
the method further comprising:
in an application, generating the imaging job; and,
sending the imaging job to the imaging driver for processing.

7. The method of claim 2 wherein establishing a UI at a job source includes establishing a UI in a direct submit application;
the method further comprising:
generating the imaging job in the direct submit application.

8. The method of claim 1 wherein receiving a list of supported adaptive universal symbols from the symbol storage device includes receiving the list of supported symbols at a time selected from the group including when the job source is configured to communicate with the imaging device, in response to imaging device-related events, and dynamically with the submission of each imaging job.

9. The method of claim 1 wherein establishing a bi-directional communication path between the job source and a symbol storage device includes establishing a bi-directional communication path with a symbol storage device selected from the group including the imaging device, an imaging server, and an information repository.

10. The method of claim 1 wherein establishing a UI representing imaging job options with adaptive universal symbols includes:
initially presenting a group of primary adaptive universal symbols; and,
subsequently presenting a group of secondary adaptive universal symbols, logically related to a selected primary adaptive universal symbol.

11. The method of claim 10 wherein receiving a list of supported adaptive universal symbols from the symbol storage device, at the job source, includes receiving adaptive universal symbol appellate code; and,
wherein subsequently presenting a group of secondary adaptive universal symbols, logically related to a selected primary adaptive universal symbol, includes the job source using the appellate code to determine potential secondary adaptive universal symbol selections associated with each primary adaptive universal symbol, and to generate the secondary group of adaptive universal symbols after a primary adaptive universal symbol is selected.

12. The method of claim 10 wherein subsequently presenting a group of secondary adaptive universal symbols, logically related to a selected primary adaptive universal symbol includes:
the job source sending a selected primary adaptive universal symbol to the imaging device;
the imaging device dynamically generating secondary adaptive universal symbols logically related to the selected primary adaptive universal symbol; and,
the imaging device sending the generated secondary adaptive universal symbols to the job source UI for presentation.

13. The method of claim 1 wherein establishing a UI representing imaging job options with adaptive universal symbols includes providing a display presenting a palette for adaptive universal symbol options and a drop zone for selected adaptive universal symbols.

14. The method of claim 1 wherein sending the imaging job to an imaging-device, in an imaging device-specific format, includes sending the imaging job in a format selected from the group including a renderer-independent format such as TIFF and JPEG encoded images, a renderer-dependent format such as a page description language (PDL), fax formats such as G3 and G4, an imaging device-ready format such as a raster bitmap, and an imaging job wrapped in a printer job language (PJL) format.

15. The method of claim 3 wherein cross-referencing adaptive universal symbols to document/image repository job options includes cross-referencing adaptive universal symbols to options selected from the group including conversion format, source and destination, access rights, encryption, encoding, meta-data, and filtering.

16. A system for processing an imaging job using adaptive universal symbols, the system comprising:
a client device job source having an interface to receive a list of adaptive universal symbols supported by an imaging device external to the client device, where an adaptive universal symbol is defined as a non-text graphic icon representing a function associated with imaging, a user interface (UI) for presenting imaging job options represented with adaptive universal symbols from the received list of supported symbols and for accepting adaptive universal symbol selections, the job source having an interface for sending an imaging job in an imaging device-specific format, along with the adaptive universal symbol selections; and, a symbol storage device external to the client device having an interface to supply the list of supported adaptive universal symbols;

an imaging device external to the client device having an interface to accept the imaging job and adaptive universal symbol selections and an interface to supply the imaging job processed in response to the selected adaptive universal symbols.

17. The system of claim 16 wherein the job source is selected from the group including an imaging driver and a direct submit application.

18. The system of claim 16 wherein the imaging device is a device selected from the group including a printer, scanner, fax, copier, document/image repository, X-ray machine, electronic whiteboard, Internet publishing device, and magnetic resonance imaging (MRI) device.

19. The system of claim 18 wherein the job source UI cross-references adaptive universal symbols to print, copy, and fax job options selected from the group including staple, cut, fold, hole-punch, trim, N-up, duplex, paper size, input tray, output bin, copies, collation, margin, sheet/page orientation, and front/back covers.

20. The system of claim 18 wherein the job source UI cross-references adaptive universal symbols to scan job options selected from the group including resolution, clipping, output format, image orientation, OCR, color space, and compression format.

21. The system of claim 18 wherein the job source UI cross-references adaptive universal symbols to document/image repository options selected from the group including conversion format, source and destination, access rights, encryption, encoding, meta-data, and filtering.

22. The system of claim 17 further comprising:
an application having an interface to supply a generated imaging job;
wherein the job source is an imaging driver having an interface to accept the imaging job from the application for processing.

23. The system of claim 17 wherein the job source is a direct submit application that generates the imaging job.

24. The system of claim 16 wherein the job source receives the list of supported adaptive universal symbols from the symbol storage device at a time selected from the group including when the job source is configured to communicate with the imaging device, in response to imaging device-related events, and dynamically with the submission of each imaging job.

25. The system of claim 16 wherein the symbol storage device is a device selected from the group including the imaging device, an imaging server, and an information repository.

26. The system of claim 16 wherein the job source UI initially presents a group of primary adaptive universal symbols, and subsequently presents a group of secondary adaptive universal symbols, logically related to a selected primary adaptive universal symbol.

27. The system of claim 26 wherein the job source receives the list of supported adaptive universal symbols from the symbol storage device, with adaptive universal symbol appellate code; and,
wherein the job source UI uses the appellate code to determine potential secondary adaptive universal symbol selections associated with each primary symbol, and generate the secondary group of adaptive universal symbols after a primary symbol is selected.

28. The system of claim 26 wherein the job source sends a selected primary adaptive universal symbol to the imaging device; and,
wherein the imaging device dynamically generates secondary adaptive universal symbols logically related to the selected primary adaptive universal symbol and sends the generated secondary adaptive universal symbols to the job source UI for presentation.

29. The system of claim 16 wherein the job source UI includes a display presenting a palette for adaptive universal symbol options and a drop zone for selected adaptive universal symbols.

30. The system of claim 16 wherein the job source sends the imaging job to the imaging device in an imaging device-specific format selected from the group including a renderer-independent format such as TIFF and JPEG encoded images, a renderer-dependent format such as a page description language (PDL), a fax format such as G3 and G4, an imaging device-ready format such as a raster bitmap, and an image job wrapped in a printer job language (PJL) format.

* * * * *